US010409001B2

(12) United States Patent
Young et al.

(10) Patent No.: US 10,409,001 B2
(45) Date of Patent: Sep. 10, 2019

(54) WAVEGUIDE FABRICATION WITH SACRIFICIAL SIDEWALL SPACERS

(71) Applicant: Applied Materials, Inc., Santa Clara, CA (US)

(72) Inventors: Michael Yu-tak Young, Cupertino, CA (US); Wayne McMillan, San Jose, CA (US); Rutger Meyer Timmerman Thijssen, Sunnyvale, CA (US); Robert Jan Visser, Menlo Park, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 15/992,845

(22) Filed: May 30, 2018

(65) Prior Publication Data
US 2018/0348429 A1  Dec. 6, 2018

Related U.S. Application Data

(60) Provisional application No. 62/515,381, filed on Jun. 5, 2017.

(51) Int. Cl.
*G02B 6/34* (2006.01)
*G02B 6/122* (2006.01)
*G06F 3/01* (2006.01)
*G02B 27/01* (2006.01)
*G02B 6/12* (2006.01)

(52) U.S. Cl.
CPC ....... *G02B 6/1223* (2013.01); *G02B 27/0172* (2013.01); *G06F 3/011* (2013.01); *G02B 2006/12038* (2013.01); *G02B 2006/12107* (2013.01); *G02B 2006/12176* (2013.01)

(58) Field of Classification Search
CPC .............. G02B 6/1223; G02B 27/0172; G02B 2006/12107; G02B 2006/12038; G02B 2006/12176; G06F 3/011
See application file for complete search history.

(56) References Cited

U.S. PATENT DOCUMENTS

| 6,285,813 | B1 | 9/2001 | Schultz et al. |
| 7,101,048 | B2 | 9/2006 | Travis |
| 7,418,170 | B2 | 8/2008 | Mukawa et al. |
| 8,189,263 | B1 | 5/2012 | Wang et al. |
| 8,467,133 | B2 | 6/2013 | Miller |
| 9,329,325 | B2 * | 5/2016 | Simmonds ........... G02B 6/0038 |
| 2004/0156589 | A1 | 8/2004 | Gunn et al. |
| 2007/0230534 | A1 * | 10/2007 | Erlandson ............. H01S 3/0602 372/102 |
| 2010/0321781 | A1 * | 12/2010 | Levola ............... G02B 27/0081 359/569 |

(Continued)

*Primary Examiner* — Ellen E Kim
(74) *Attorney, Agent, or Firm* — Patterson + Sheridan LLP (57) ABSTRACT

Embodiments described herein relate to apparatus and methods for display structure fabrication. In one embodiment, a waveguide structure having an input grating structure and an output grating structure is fabricated and a spacer material is deposited on the waveguide. The spacer material is etched from various portions of the waveguide structure and a high refractive index material is deposited on the waveguide. Portions of the spacer material remaining on the waveguide structure are removed leaving the high refractive index material disposed on desired surfaces of the waveguide structure.

20 Claims, 6 Drawing Sheets

(56) References Cited

U.S. PATENT DOCUMENTS

| | | | |
|---|---|---|---|
| 2012/0212499 A1 | 8/2012 | Haddick et al. | |
| 2013/0247973 A1* | 9/2013 | Kim | B82Y 20/00 |
| | | | 136/256 |
| 2014/0146394 A1 | 5/2014 | Tout et al. | |
| 2015/0063753 A1* | 3/2015 | Evans | G02B 6/34 |
| | | | 385/37 |
| 2015/0205126 A1 | 7/2015 | Schowengerdt | |
| 2016/0033784 A1* | 2/2016 | Levola | G02B 27/4205 |
| | | | 385/37 |
| 2017/0315346 A1* | 11/2017 | Tervo | G02B 27/0172 |
| 2018/0172995 A1* | 6/2018 | Lee | G02B 27/0172 |

\* cited by examiner

WAVEGUIDE FABRICATION WITH SACRIFICIAL SIDEWALL SPACERS

CROSS-REFERENCE TO RELATED APPLICATIONS

This application claims benefit of U.S. Provisional Patent Application No. 62/515,381, filed Jun. 5, 2017, the entirety of which is herein incorporated by reference.

BACKGROUND

Field

Embodiments of the present disclosure generally relate to display devices for augmented, virtual, and mixed reality. More specifically, embodiments described herein provide for waveguide fabrication utilizing sacrificial sidewall spacers.

Description of the Related Art

Virtual reality is generally considered to be a computer generated simulated environment in which a user has an apparent physical presence. A virtual reality experience can be generated in 3D and viewed with a head-mounted display (HMD), such as glasses of other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment with an image having sufficient clarity from various user viewing perspectives. For example, if a user's eye is not precisely aligned with the virtual image being displayed, the user may not be able to view the image. Moreover, the image may be blurry and have less than desirable resolution from a non-optimal viewing angle.

Accordingly, what is needed in the art are improved augmented reality display devices.

SUMMARY

In one embodiment, a waveguide fabrication method is provided. The method includes fabricating a waveguide structure having an input grating structure and an output grating structure using a lithography process and depositing a spacer material on the waveguide structure. An etching process is performed to remove portions of the spacer material from and expose surfaces of the waveguide structure. The spacer material remains on sidewalls of the input grating structure and sidewalls of the output grating structure after performing the etching process. A high refractive index material is deposited on the exposed surface of the waveguide structure and the spacer material is removed from the sidewalls of the input grating structure and the sidewalls of the output grating structure.

In another embodiment, a waveguide fabrication method is provided. The method includes depositing a spin on glass material on a glass substrate, patterning the spin on glass material to form a waveguide structure having an input grating structure and an output grating structure, and curing the spin on glass material. A spacer material is deposited on the waveguide structure and an etching process is performed to remove portions of the spacer material from and expose surfaces of the waveguide structure. The spacer material remains on the sidewalls of the input grating structure and sidewalls of the output grating structure after performing the etching process. A high refractive index material is deposited on the exposed surfaces of the waveguide structure and the spacer material is removed from the sidewalls of the input grating structure and the sidewalls of the output grating structure.

In yet another embodiment, a display structure apparatus is provided. The apparatus includes a substrate fabricated from a first material having a first refractive index and a waveguide structure disposed on the substrate and fabricated from a second material having a second refractive index substantially equal to the first refractive index. An input grating structure is formed on the waveguide structure and the input grating structure includes angled surfaces and sidewall surfaces. An output grating structure is formed on the waveguide structure and the output grating structure includes a first plurality of features having bottom surfaces defining a first plane, a second plurality of features having bottom surfaces defining one or more second planes different from the first plane, and a plurality of sidewall surfaces. A high refractive index material is disposed on the angled surfaces of the input grating structure, the bottom surfaces of the first plurality of features of the output grating structure, and the bottom surfaces of the second plurality of features of the output grating structure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to apparatus and methods for display structure fabrication. In one embodiment, a waveguide structure having an input grating structure and an output grating structure is fabricated and a spacer material is deposited on the waveguide. The spacer material is etched from various portions of the waveguide structure and a high refractive index material is deposited on the waveguide. Portions of the spacer material remaining on the waveguide structure are removed leaving the high refractive index material disposed on desired surfaces of the waveguide structure.

Figure 1:
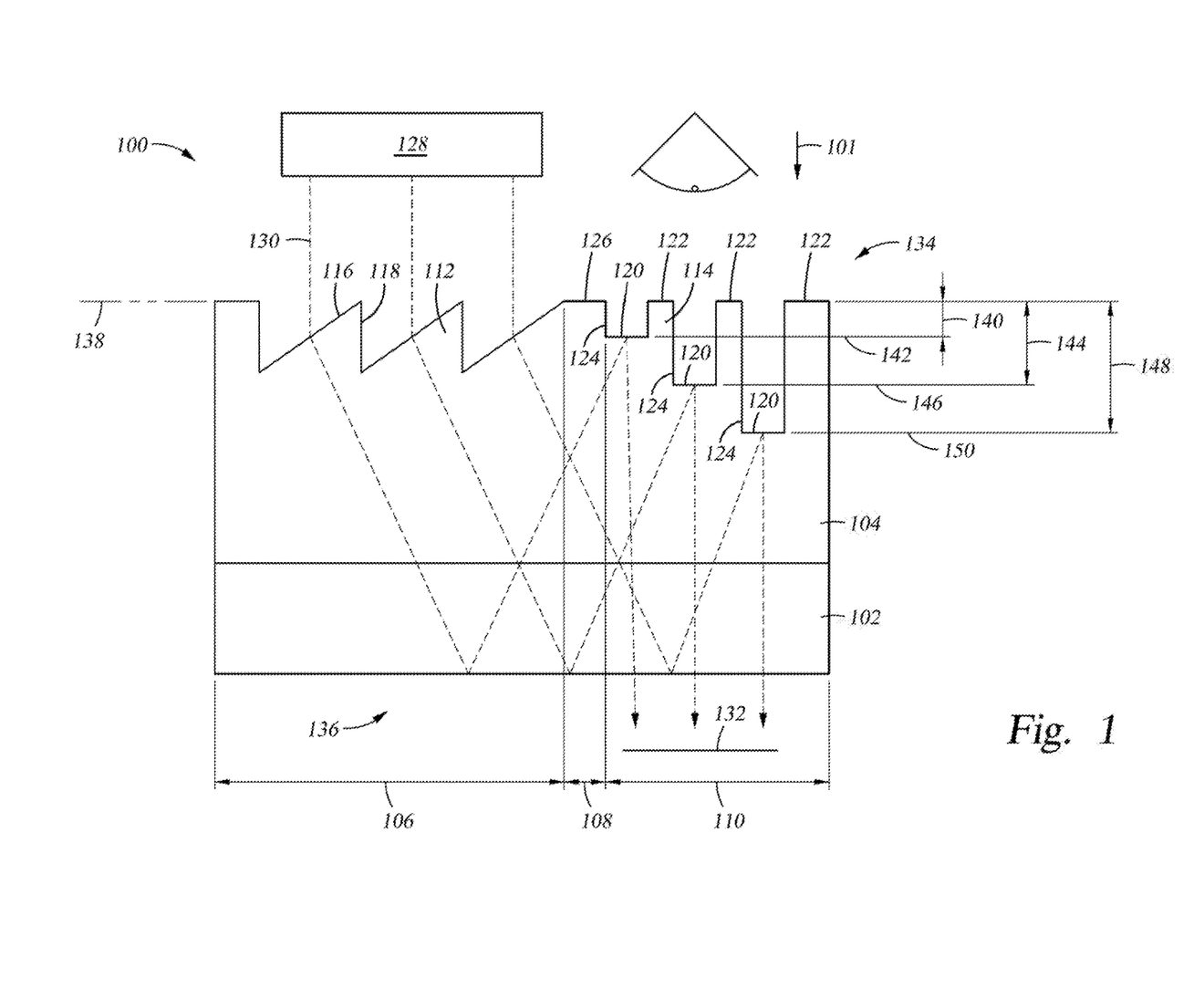
FIG. 1 is a schematic, cross-sectional view of a display structure according to an embodiment described herein.

FIG. 1 is a schematic, cross-sectional view of a display structure 100. The display structure 100 includes a substrate 102 and a waveguide structure 104. The display structure 100 includes an input coupling region 106, a waveguide region 108, and an output coupling region 110. The waveguide region 108 is located between the input coupling region 106 and the output coupling region 110. The waveguide structure 104 is disposed on and in contact with the substrate 102. A first side 134 of the display structure 100 corresponds to the waveguide structure 104 and is oriented adjacent to a user's perspective 101. A second side 136 of the display structure 100 corresponds to the substrate 102 and is oriented opposite the first side 134.

The substrate 102 is fabricated from an optically transparent material, such as glass, sapphire, or the like. The material utilized to fabricate the substrate 102 is selected to have a first refractive index, such as a refractive index between about 1.5 and about 1.7. The waveguide structure 104 is also fabricated from an optically transparent material. For example, a spin on glass material or a sol-gel material can be utilized to fabricate the waveguide structure 104. The material selected for the waveguide structure 104 has a second refractive index. In one embodiment, the material utilized for the waveguide structure 104 is selected such that the second refractive index substantially matches the first refractive index of the substrate material.

For example, the material of the substrate 102 has a first refractive index of between about 1.5 and about 1.7 and the material of the waveguide structure 104 has a second refractive index of between about 1.5 and about 1.7. By matching the refractive indices of the materials utilized to fabricate the substrate 102 and the waveguide structure 104, light propagation through both the substrate 102 and waveguide structure 104 may be achieved without substantial light refraction at an interface between the substrate 102 and the waveguide structure 104. By utilizing materials having a refractive index of between about 1.5 and about 1.7 compared to the refractive index of air (1.0), total internal reflection, or at least a high degree thereof, is achieved to facilitate light propagation through the display structure 100.

The display structure 100 is implemented in a display device, such as an augmented, virtual, or mixed/merged reality device. Examples of such devices include head mounted displays, such as glasses or goggles and the like. Accordingly, the display structure 100 may also include a microdisplay generator 128 which generates light 130 to form a virtual image at an image plane 132. The microdisplay generator 128 may be a liquid crystal on silicon image generator or other high resolution image generator. The light 130 generated by the microdisplay generator 128 is modulated by the waveguide structure 104 and propagates through the waveguide structure 104 and substrate 102 until the light 130 exits the display structure 100 and is imaged (e.g. focused) on the image plane 132.

The waveguide structure 104 includes input grating structures 112 and output grating structures 114. The input grating structures 112 are formed on the waveguide structure 104 in an area corresponding to the input coupling region 106. The output grating structure 114 are formed on the waveguide structure 104 in an area corresponding to the output coupling region 110. The input grating structures 112 and output grating structure 114 influence light propagation within the waveguide structure 104. For example, the input grating structure 112 couples in light from the microdisplay generator 128 and the output grating structure couples out light to the image plane 132.

For example, the input grating structures 112 are believed to influence the field of view of a virtual image displayed at the image plane. The output grating structures 114 influence the amount of light 130 collected and outcoupled from the waveguide structure 104. In addition, the output grating structures 114 are believed to further modulate the field of view of a virtual image from a user's perspective 101 and increase the viewing angle from which a user can view the virtual image.

The waveguide structure 104 has a top surface 126 which defines a plane 138. The input grating structures 112 include surfaces 116 which are angled relative to the plane 138. The input grating structures 112 also include sidewall surfaces 118 which are oriented normal to the plane 138.

The output grating structures 114 may be defined as trenches or wells formed in the top surface 126 of the waveguide structure 104. Each output grating structure 114 includes a bottom surface 120, a top surface 122, and sidewall surface 124. The bottom surface 120 and top surface 122 are parallel to the top surface 126. In one embodiment, the top surface 126 and the top surface 122 define the plane 138. The sidewall surfaces 124 are oriented normal to the plane 138. In one embodiment, depths of adjacent output grating structures 114 increase laterally outward away from the input grating structures 112. The output grating structures 114 of variable depths are believed to capture and outcouple light of increased angles incident on the input grating structure 112.

In one embodiment, a pitch between adjacent input grating structures 112 is between about 300 nm and about 700 nm, such as between about 400 and about 600 nm, for example, 500 nm. In another embodiment, a pitch between adjacent output grating structures 114 is between about 300 nm and about 700 nm, such as between about 400 and about 600 nm, for example, 500 nm. In one embodiment, a cross-sectional thickness of the input grating structures 112 is between about 100 nm and about 500 nm, such as between about 200 nm and about 400 nm, for example, about 300 nm. In another embodiment, a cross-sectional thickness of the output grating structures 114 is between about 100 nm and about 500 nm, such as between about 200 nm and about 400 nm, for example, about 300 nm.

A first grating structure of the output grating structures 114 has a first depth 140 which extends from the top surface 126 to a bottom surface 120 of the first grating structure. The bottom surface 120 of the first grating structure defines a first plane 142. A second grating structure of the output grating structures 114 has a second depth 144 which extends from the top surface 126 to the bottom surface 120 of the second grating structure. The second depth 144 is greater than the first depth 140. The bottom surface 120 of the second grating structure defines a second plane 146. A third grating structure of the output grating structure 114 has a third depth 148 which extends from the top surface 126 to the bottom surface 120 of the third grating structure. The third depth 148 is greater than the first depth 140 and the second depth 144. The bottom surface 120 of the third grating structure defines a third plane 146. The first plane 142, second plane 146, and third plane 150 occupy different planes.

Figure 2:
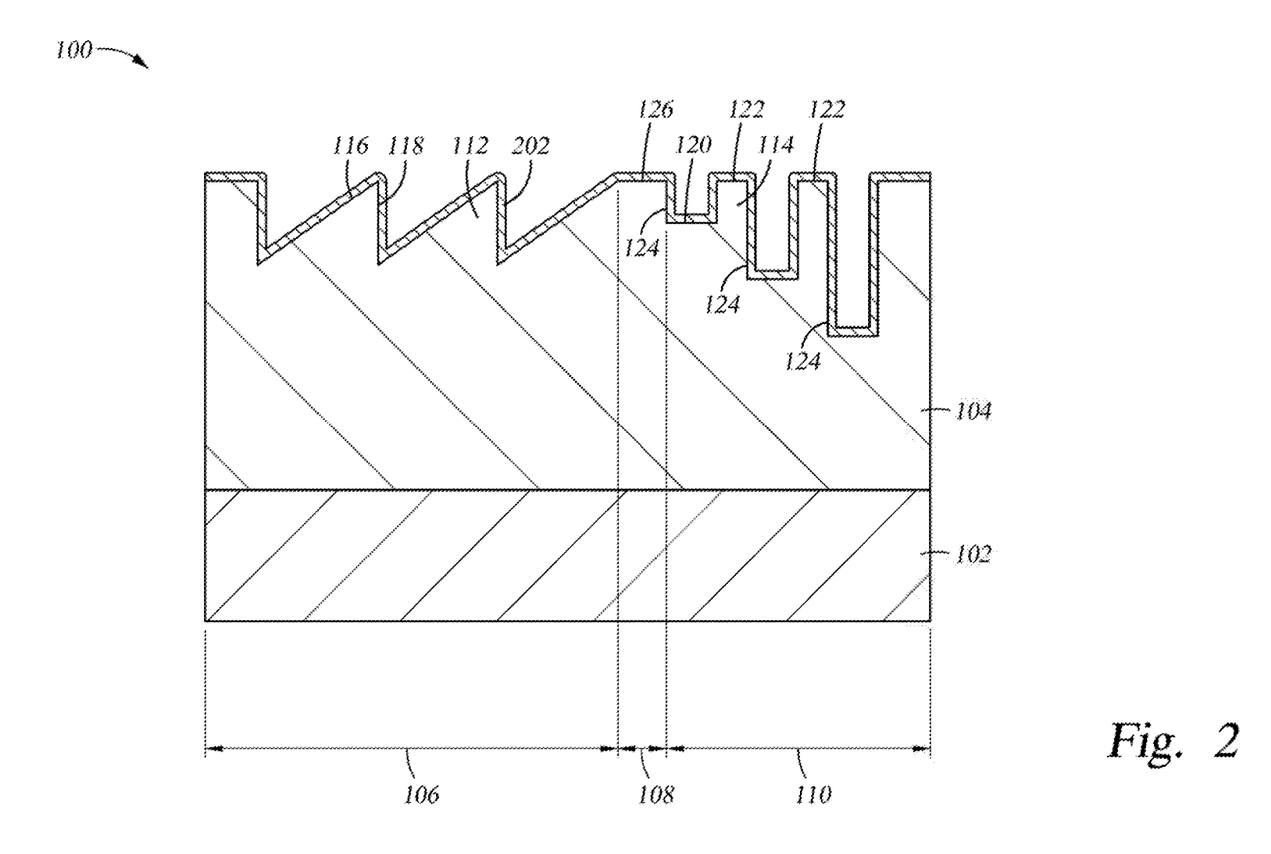
FIG. 2 is a schematic, cross-sectional view of the display structure of FIG. 1 having a spacer material layer formed thereon according to an embodiment described herein.

FIG. 2 is a schematic, cross-sectional view of the display structure 100 of FIG. 1 having a spacer material layer 202 formed thereon. The spacer material layer 202 is deposited on the top surface 126 of the waveguide structure 104. More specifically, the spacer material layer 202 is deposited on the angled surfaces 116 and the sidewall surface 118 of the input grating structures 112. The spacer material layer 202 is also deposited on the bottom surfaces 120, the top surfaces 122, and the sidewall surfaces 124 of the output grating structures. In one aspect, the spacer material layer 202 may be formed conformally over the surfaces.

The spacer material layer 202 can be deposited by suitable deposition processes, such as a chemical vapor deposition process. Tools suitable for performing the spacer material layer deposition are available from Applied Materials, Inc., Santa Clara, Calif. The spacer material layer 202 is formed from oxygen and/or nitrogen containing materials. For example, the spacer material layer 202 may be formed from a $ZrO_2$ material. In another example, the spacer material layer 202 may be formed from a SiON material. In one embodiment, the spacer material layer 202 is deposited to a thickness of between about 50 nm and about 200 nm, such as between about 100 nm and about 150 nm, for example, about 125 nm.

Figure 3:
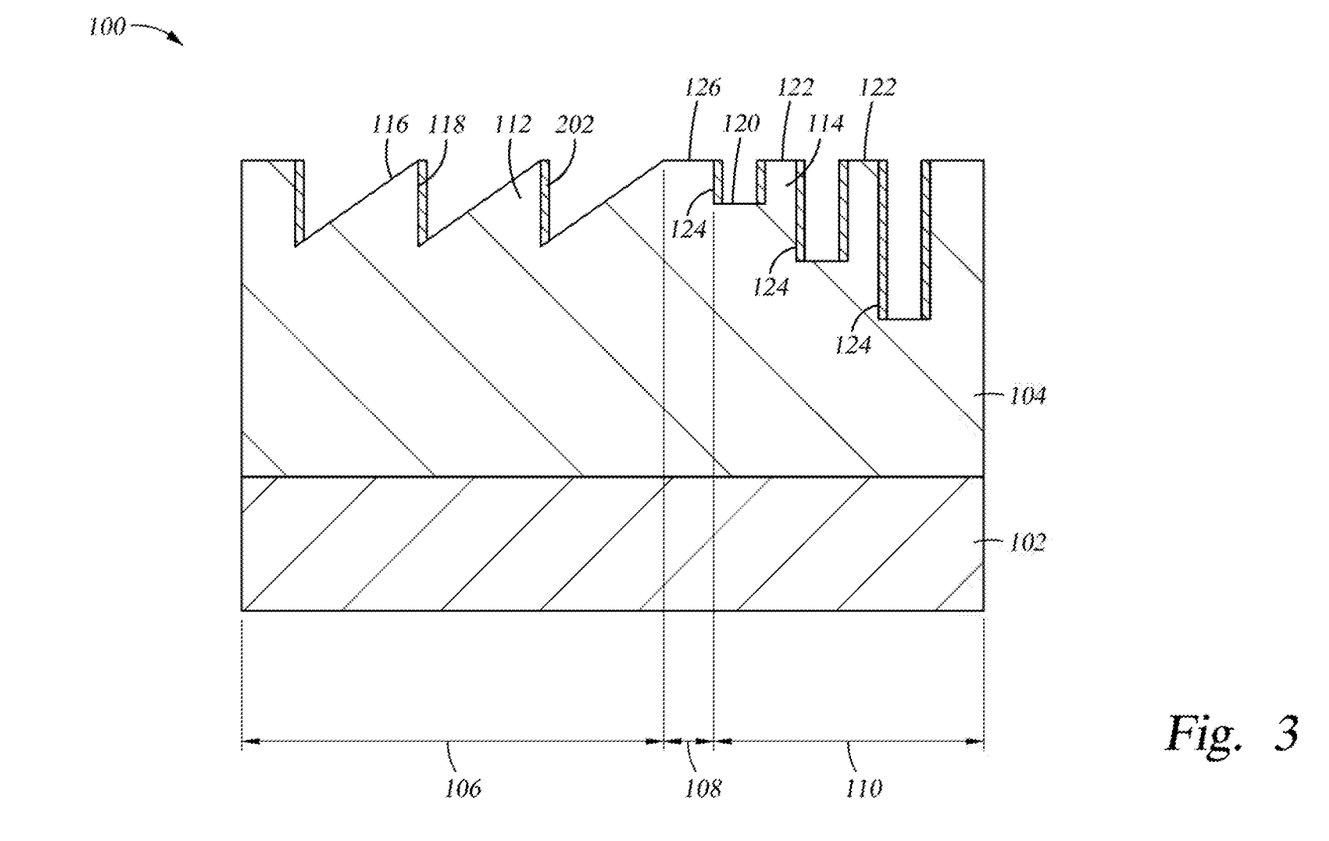
FIG. 3 is a schematic, cross-sectional view of the display structure of FIG. 2 after performing an etching process according to an embodiment described herein.

FIG. 3 is a schematic, cross-sectional view of the display structure 100 of FIG. 2 after performing an etching process. The etching process, such as a reactive ion etching process or the like, is used to selectively remove portions of the spacer material layer 202. In one embodiment, the etching process is an anisotropic etching process. The etching process removes the spacer material layer 202 from the angled surface of the grating structures 112 and the bottom surfaces 120 and top surfaces 122 of the output grating structures 114. Surfaces which have no spacer material disposed thereon are considered to be exposed surfaces. However, the spacer material layer 202 remains, at least partially, on the sidewalls 118 of the input grating structure 112 and the sidewalls 124 of the output grating structures 114 after performing the etching process.

Figure 4:
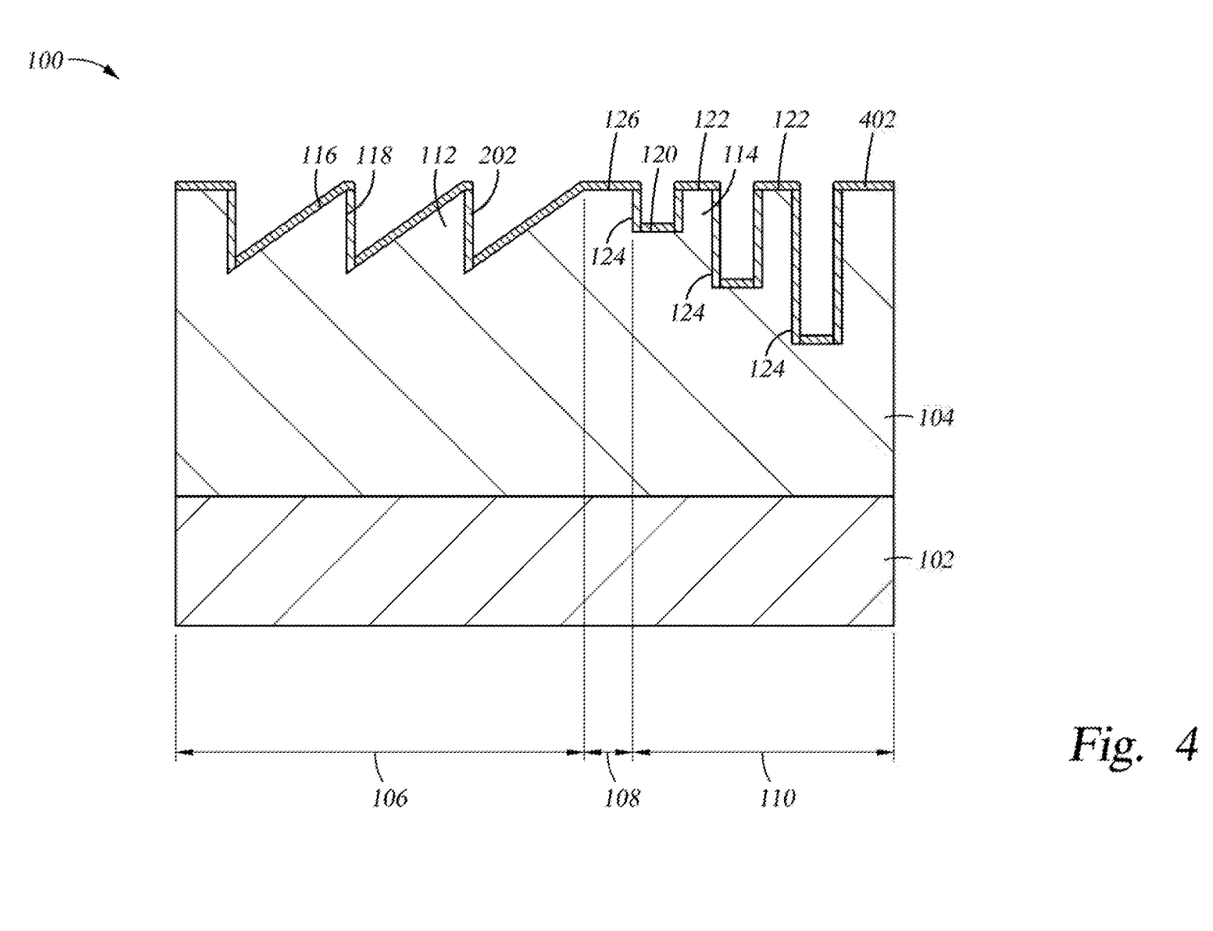
FIG. 4 is a schematic, cross-sectional view of the display structure of FIG. 3 having the etched spacer material and a high refractive index material formed thereon according to an embodiment described herein.

FIG. 4 is a schematic, cross-sectional view of the display structure 100 of FIG. 3 after having etched spacer material layer 202 and following formation of a high refractive index material 402 thereon. Generally, as utilized herein, a high refractive index is a refractive index of greater than about 2.0. The high refractive index material 402 is directionally deposited on the exposed surfaces (e.g. the angled surfaces 118, bottom surfaces 120, top surfaces 122, and top surface 126). The spacer material layer 202 prevents deposition of the high refractive index material 402 thereon so that substantially no deposition occurs on the sidewall surfaces 118, 124.

The high refractive index material 402 is directionally deposited by a physical vapor deposition process. Tools suitable for performing the physical vapor deposition process are available from Applied Materials, Inc., Santa Clara, Calif. The high refractive index material is a material which has a refractive index greater than about 1.7, such as a refractive index of greater than about 2.0, for example, a refractive index between about 2.0 and about 3.0, such as a refractive index of about 2.5. Metal oxide materials are selected for utilization as the high refractive index material 402. One example of a metal oxide includes a $TiO_2$ material.

Figure 5:
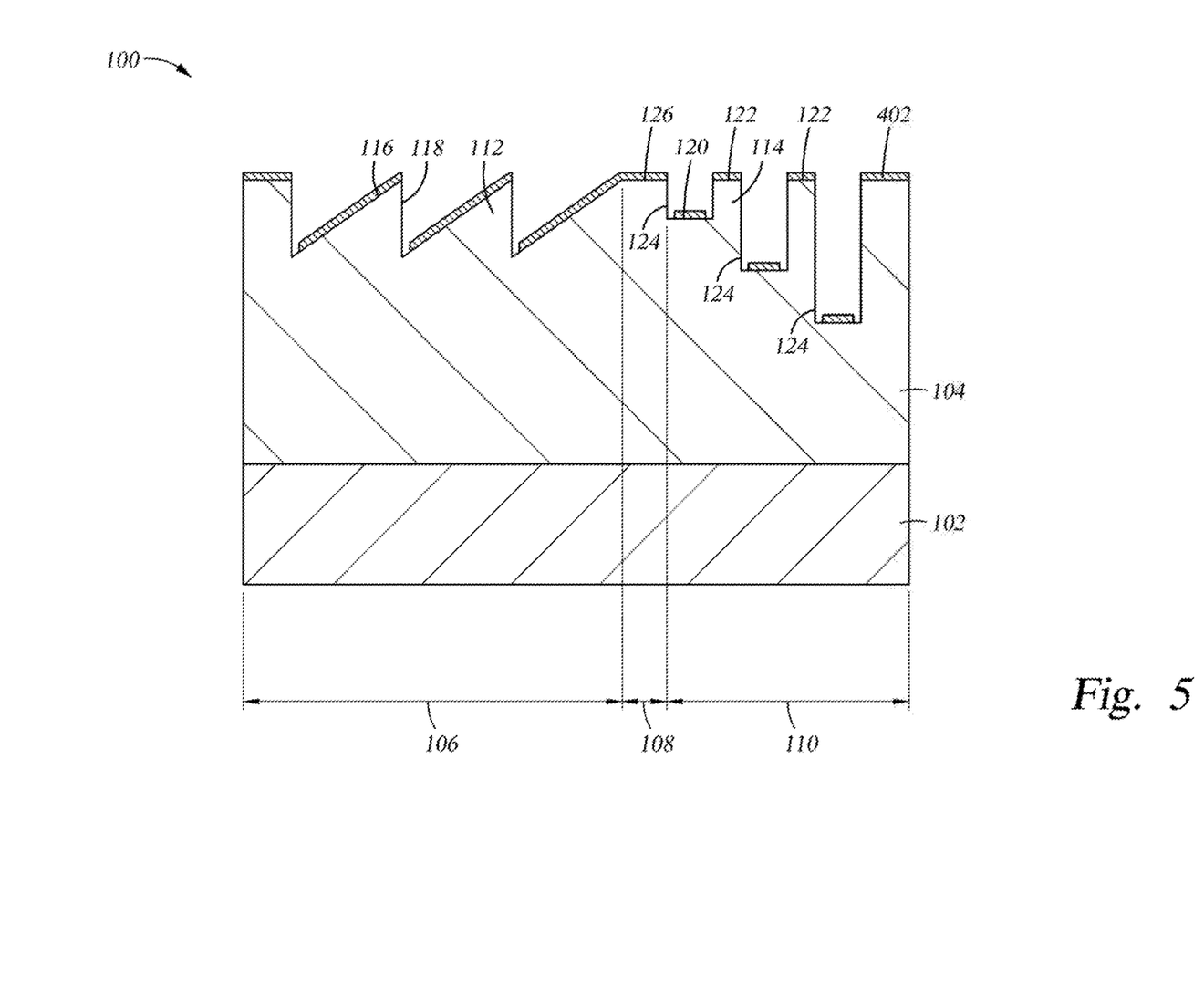
FIG. 5 is a schematic, cross-sectional view of the display structure of FIG. 4 having the high refractive index material formed thereon with the spacer material removed according to an embodiment described herein.

FIG. 5 is a schematic, cross-sectional view of the display structure 100 of FIG. 4 having the high refractive index material 402 formed thereon and the spacer material layer 202 removed. A selective etching process is utilized to remove the spacer material layer 202 preferentially to the high refractive index material 402. For example, the etching process utilizes etch chemistries selected to remove the spacer material layer 202 and the etch chemistries are predominantly unreactive with the high refractive index material 402. After performing the selective etching process, the high refractive index material 402 remains disposed on the angled surfaces 118 of the input grating structure 112, the top surfaces 126 of the waveguide structure 104, the bottom surfaces 120 of the output grating structures 114 and the top surfaces 122 of the output grating structures 114.

It is believed that the high refractive index material 402, which has a refractive index greater than the refractive index of the waveguide structure 104 and the substrate 102, formed on selected surfaces of the waveguide structure 104, improves the output coupling performance of the output grating structures 114. For example, it is believed that the high refractive index material 402 enables increased light outcoupling from the waveguide structure 104 which results in improved imaging clarity, image brightness, increased user viewing perspective, while reducing image smearing and color cross coupling that results in perceived image blurring.

Figure 6:
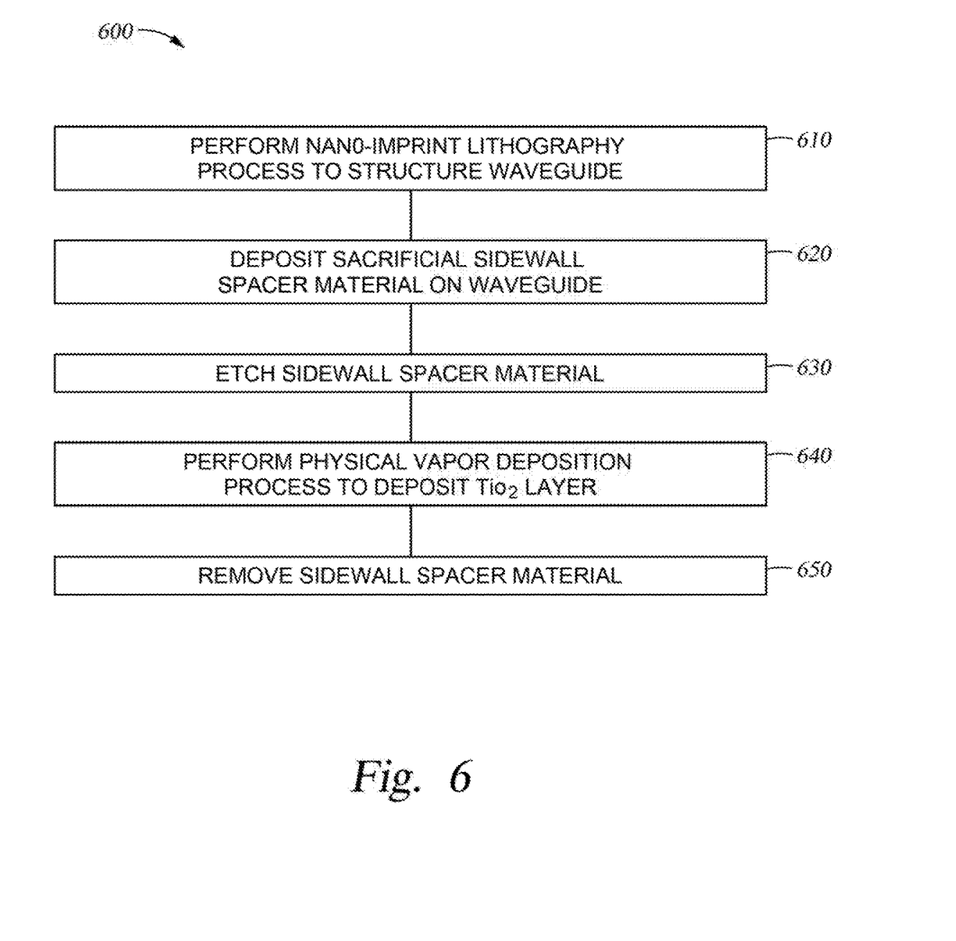
FIG. 6 is a flow chart illustrating operations of a method for forming a display structure according to an embodiment described herein.

FIG. 6 is a flow chart illustrating operations of a method 600 for forming a waveguide structure. Generally, a waveguide structure is fabricated on a substrate. In one example, the waveguide structure is formed of a spin on glass or sol gel material disposed on a glass substrate. At operation 610, a nanoimprint lithography process is performed to pattern the waveguide structure. The nanoimprint lithography process utilizes a stamp which imprints the spin on glass or sol gel material with a desired topography. After performing the nanoimprint lithography process, the material utilized to fabricate the waveguide structure is cured. Examples of curing processes to harden the material include thermal curing processes and/or ultraviolet light curing processes.

At operation 620, a sacrificial sidewall spacer material, such as the spacer material 202 described supra, is deposited on the waveguide structure. At operation 630 the sidewall spacer material is etched to expose selected surfaces of the waveguide structure. The etching process is tuned to remove the sidewall spacer material from all surfaces of the waveguide structure except sidewall surfaces as described above.

At operation 640, a physical vapor deposition process is performed to deposit a high refractive index material, such as the material 402, on the exposed surface of the waveguide structure. At operation 650, the sidewall spacer material remaining on the sidewalls is removed. The resulting waveguide structure has the high refractive index material disposed on all surfaces of the waveguide except the sidewall surfaces.

While the foregoing is directed to embodiments of the present disclosure, other and further embodiments of the disclosure may be devised without departing from the basic scope thereof, and the scope thereof is determined by the claims that follow.

What is claimed is:

1. A waveguide fabrication method, comprising:
    fabricating a waveguide structure having an input grating structure and an output grating structure using a lithography process;
    depositing a spacer material on the waveguide structure;
    performing an etching process to remove portions of the spacer material from and expose surfaces of the waveguide structure, wherein the spacer material remains on sidewalls of the input grating structure and sidewalls of the output grating structure after performing the etching process;
    depositing a high refractive index material on the exposed surfaces of the waveguide structure, said high refractive index material having a refractive index greater than a refractive index of the waveguide structure; and
    removing the spacer material from the sidewalls of the input grating structure and the sidewalls of the output grating structure.

2. The method of claim 1, wherein the spacer material comprises a $ZrO_2$ material or SiON material.

3. The method of claim 2, wherein the spacer material is deposited by a physical vapor deposition process.

4. The method of claim 2, wherein the spacer material is deposited by a chemical vapor deposition process.

5. The method of claim 1, wherein the etching process is a reactive ion etching process.

6. The method of claim 1, wherein the high refractive index material is deposited by a physical vapor deposition process.

7. The method of claim 1, wherein the waveguide structure is disposed on and in contact with a substrate.

8. The method of claim 7, wherein the waveguide structure is fabricated from a sol-gel material or a spin on glass material.

9. The method of claim 7, wherein the substrate is fabricated from a glass material.

10. The method of claim 9, wherein the waveguide structure and the substrate are fabricated from different materials having a substantially equal refractive index.

11. The method of claim 10, wherein the refractive index is between about 1.5 and about 1.7.

12. The method of claim 1, wherein the high refractive index material comprises a $TiO_2$ material layer having a refractive index of about 2.5.

13. A waveguide fabrication method, comprising:
    depositing a spin on glass material on a glass substrate;
    patterning the spin on glass material utilizing a lithography process to form a waveguide structure having an input grating structure and an output grating structure;
    curing the spin on glass material;
    depositing a spacer material on the waveguide structure;
    performing an etching process to remove portions of the spacer material from and expose surfaces of the waveguide structure, wherein the spacer material remains on sidewalls of the input grating structure and sidewalls of the output grating structure after performing the etching process;
    depositing a high refractive index material on the exposed surfaces of the waveguide structure, said high refractive index material having a refractive index greater than a refractive index of the waveguide structure and a refractive index of the substrate; and
    removing the spacer material from the sidewalls of the input grating structure and the sidewalls of the output grating structure.

14. The method of claim 13, wherein the curing the spin on glass material is performed by a thermal curing process or an ultraviolet curing process.

15. The method of claim 13, wherein the waveguide structure and the glass substrate are fabricated from materials having a substantially equal refractive index.

16. The method of claim 15, wherein the refractive index is between about 1.5 and about 1.7.

17. The method of claim 13, wherein the high refractive index material has a refractive index of about 2.5.

18. A display structure apparatus, comprising:
    a substrate fabricated from a first material having a first refractive index;
    a waveguide structure disposed on the substrate and fabricated from a second material having a second refractive index substantially equal to the first refractive index;
    an input grating structure formed on the waveguide structure, wherein the input grating structure comprises:
        angled surfaces; and
        sidewall surfaces;
    an output grating structure formed on the waveguide structure, wherein the output grating structure comprises:
        a first plurality of features having bottom surfaces defining a first plane;
        a second plurality of features having bottom surfaces defining one or more second planes different from the first plane; and
        a plurality of sidewall surfaces; and
    a high refractive index material disposed on the angled surfaces of the input grating structure, the first bottom surfaces of the first plurality of features of the grating structure, and the bottom surface of the second plurality of features of the output grating structure, said high refractive index material having a refractive index greater than a refractive index of the waveguide structure and a refractive index of the substrate.

19. The apparatus of claim 18, wherein the first refractive index and the second refractive index are between about 1.5 and about 1.7.

20. The apparatus of claim 18, wherein the high refractive index material is a $TiO_2$ material having a refractive index of about 2.5.

* * * * *